Aug. 19, 1952     F. E. TUTTLE     2,607,682
METHOD OF MAKING CHANGEABLE DISPLAY APPARATUS
Filed May 27, 1950
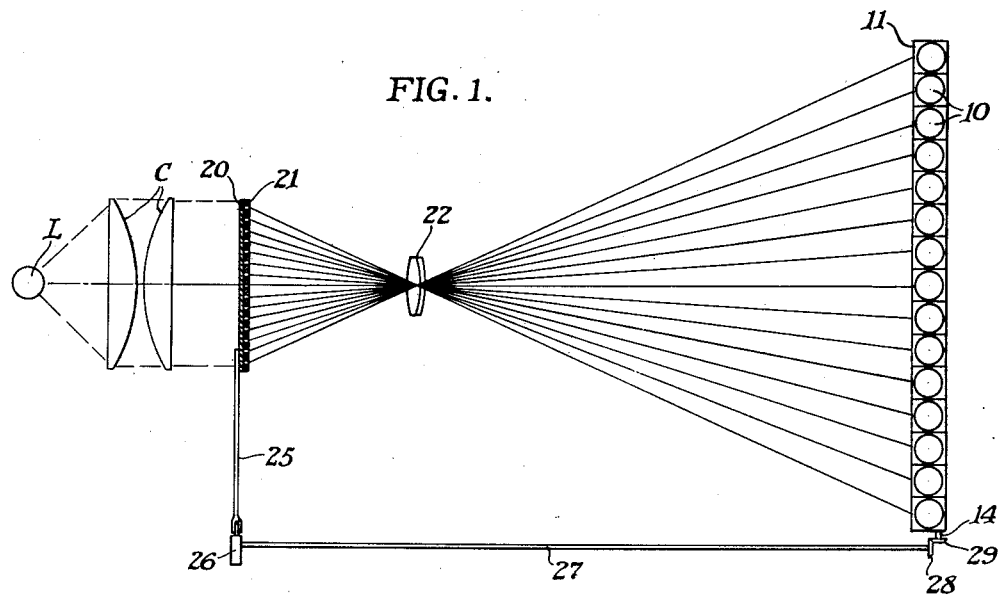
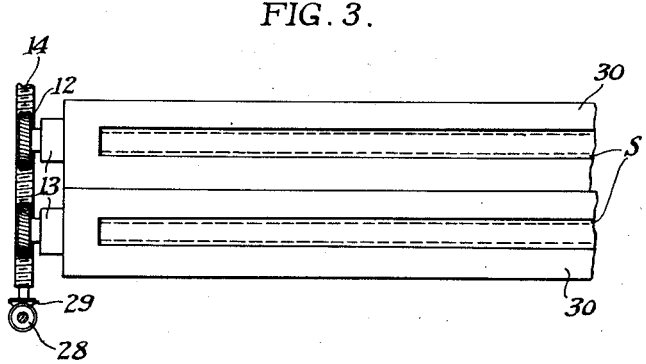
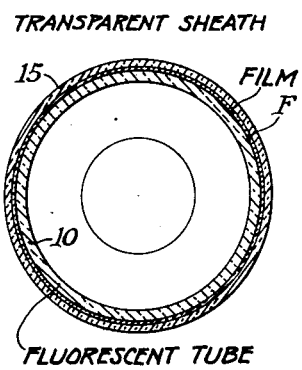
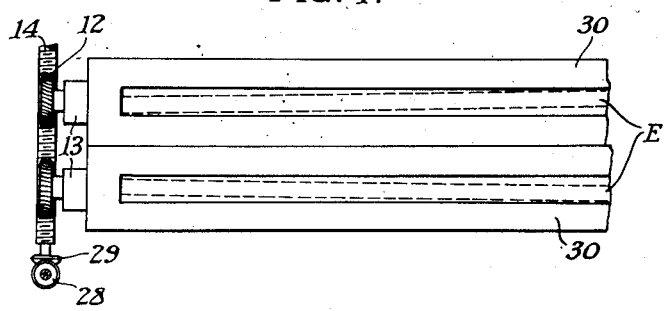
FORDYCE E. TUTTLE
INVENTOR
BY
ATTORNEYS Patented Aug. 19, 1952

2,607,682

UNITED STATES PATENT OFFICE 2,607,682

METHOD OF MAKING CHANGEABLE DISPLAY APPARATUS

Fordyce E. Tuttle, Rochester, N. Y., assignor to Eastman Kodak Company, Rochester, N. Y., a corporation of New Jersey Application May 27, 1950, Serial No. 164,721

4 Claims. (Cl. 95—5)

The present invention relates to changeable display apparatus of the rotating tube type wherein picture elements on the peripheries of a plurality of stacked lamps are viewed by transmitted light through a slotted grid and coact to form different composite pictures, and particularly to the method of making or exposing the lamps to be used in such apparatus.

Copending patent application Serial No. 126,317, filed November 9, 1949, in the name of Miller R. Hutchison, Jr., discloses a changeable display apparatus consisting of a plurality of tubular lamps rotatably arranged in side-by-side relation in the form of a bank, and adapted to be rotated in synchronism. Each lamp has arranged around its periphery a plurality of narrow picture elements extending longitudinally thereof which move substantially into and out of a picture plane when the lamps are rotated, and in which picture plane the picture elements on several lamps (which, by the way, are in the form of transparencies) coact with one another to produce different pictures in succession when viewed through a slotted grid whose slits extend longitudinally of the lamps, and are substantially the same width as the picture elements on the lamps.

Up to the present time, the preferred way of placing these picture elements on the lamp peripheries, particularly if the pictures are of the continuous tone type and are to portray motion, is to cover each lamp, while dark, with a light-sensitive emulsion, and project a magnified image of a conventional motion picture film onto the lamps through a slotted grid. This exposes longitudinal segments of the lamp peripheries corresponding to narrow transverse elements of the complete picture, and when these exposed areas are processed to transparencies and viewed through the slotted grid, these picture elements coact to form the complete picture.

The use of motion picture films, or other small transparencies, as projection objects presents the difficulty that one cannot see how a given motion sequence will appear as a grid picture until the entire sign has been exposed, processed, and played back. Errors in subject choice, as well as manufacture, are therefore costly in time and money. Furthermore, when small frames of film are used as projection subjects, considerable difficulty is encountered in projecting them up to large sign dimensions which may be as large as 10' x 20', or more.

The primary object of the present invention is to provide a method of making or exposing the picture elements on the peripheries of the lamps of a sign or display apparatus of the type described which overcomes the disadvantages and shortcomings above mentioned which are characteristic of prior art methods of making these signs.

Another object is to provide a method of making changeable display apparatus of the type set forth wherein large size, i. e., 8" x 10", 5" x 7", etc., original grid-type composite pictures are used as the projection objects and are projected directly to the lamps of the apparatus for exposure purposes. Several advantages result from this procedure. First, with the larger object size, a much shorter throw is needed to project up to the large sign size. Secondly, since the object is a small size original grid picture, it can be displayed beforehand and its quality as a grid-type picture can be ascertained prior to being reproduced in the form of a large sign.

A further object is to provide a method of exposing the subject matter on the lamps of changeable display apparatus of the type described wherein the original grid picture is moved relative to its line screen and the lamps forming a part of the final sign are rotated behind their slotted grid synchronously and in timed relation so that a motion sequence on the original grid picture can be exposed automatically and continuously on the lamps.

And yet, another object is to provide a method of exposing the desired subject matter on the lamps of the changeable display apparatus of the type described which provides for the elimination of moiré pattern difficulty normally incurred when projecting from one composite picture to another.

The novel features that I consider characteristic of my invention are set forth with particularity in the appended claims. The invention itself, however, both as to its organization and the results obtained thereby, together with additional objects and advantages thereof will best be understood from the following description of specific embodiments when read in connection with the accompanying drawings, in which:

Fig. 1 is a schematic view showing how the lamps forming part of a large size changeable display apparatus may be exposed in accordance with a preferred embodiment of the present invention;

Fig. 2 is an enlarged vertical section of one of the lamps showing a light-sensitive film held in wrapped relation thereon by a transparent plastic sheath for exposure purposes;

Fig. 3 is a partial front elevational view showing two lamps of a changeable display apparatus behind their grid slots and showing how the projected picture elements on the lamp periphery should line up with the grid slots to eliminate objectionable moiré pattern, and Fig. 4 is a view similar to Fig. 3 but showing the projected picture elements on the lamps inclined relative to their respective grid slots so as to produce a moiré pattern.

Like reference characters refer to corresponding parts throughout the drawings.

Referring now to Figs. 1 and 2, according to the present invention a plurality of long, tubular, electric lamps 10, which are to carry the subject matter of the changeable display apparatus or sign, after being covered with a light-sensitive emulsion are rotatably mounted in parallel side-by-side relation behind a slotted grid 11. These lamps may be of any suitable form, such as fluorescent, neon, etc., and their length and number will depend upon the dimension of the sign area the display apparatus is to have. These lamps can be rotatably mounted in a frame-like support in the manner shown in copending patent application Serial No. 164,722, filed May 27, 1950, so that worm wheels 12 carried by metal sleeves 13 on one end thereof will be brought into driving engagement with a worm 14 rotatably mounted on the support when the lamps are slipped into position on the support.

If the picture to be applied to the lamp peripheries is to be reproduced in black and white, then the lamp peripheries can have a light-sensitive emulsion applied directly thereto. However, if the pictures are to be colored ones, then the emulsion is applied to the lamps in the form of a film F which is wrapped around each lamp and held in wrapped relation thereon by a transparent sheath 15 which is slipped over the film after it is wrapped on the lamp as shown in Fig. 2. These films, after exposure, are removed from the lamps for processing to a transparency and are then rewrapped on the lamp peripheries for display purposes. Inasmuch as each film is made up of a plurality of narrow picture elements, each forming a part of a different one of a series of pictures, the films should be numbered and indexed relative to their respective lamps so that they can be returned to the proper lamp and can be oriented thereon, so that the picture elements on the different lamps will properly coact with one another to form the desired pictures.

In prior art procedure, the subject matter to be placed on the lamps is in the form of small transparencies, magnified images of which are projected onto the lamps through the slotted grid in front thereof. If a motion sequence is to be applied to the lamps, then the subject is usually a 16 or 35 mm. film, the film being intermittently advanced one frame at a time and the lamps being rotatably indexed one slot width at each exposure in order to place the motion sequence on the lamp peripheries.

According to the present invention, the projection object is an original grid-type composite picture 20 which is positioned behind its line screen 21 and illuminated from the rear by a suitable means, such as the combination of lamp L and condenser assembly C. As is well known, this original grid-type composite picture may be as large as 8″ x 10″ in size and will comprise a plurality of different still pictures or subject positions of a motion sequence which can be successively rendered apparent when the picture is viewed through a line screen like that through which it was originally exposed, and when the picture and line screen are moved relative to one another in a direction substantially normal to the lines thereof. A magnified image of the grid picture 20 is projected by a suitable projection lens 22 onto the lamps 10 through the slots of the grid 11. The magnification of the projected subject is preferably such that there is a one-to-one correspondence between the lines of the line screen 21 and the slots in the grid 11, so that each picture element of the composite picture 20 is projected through one of the slots in the grid and exposed as an element on the lamp behind that slot. The orientation of the composite picture 20 and the grid and lamps of the sign is such that each element of the composite picture, or each line of the screen, accurately aligns with the slots in grid 11. The individual rays in Fig. 1 are intended to show the projected image of each of the picture elements on the composite picture 20 uncovered by the line screen in any one of the several possible relative positions of the two, and it will be apparent that the image of each picture element is projected through a different one of the slots in the grid and hence onto a different one of the lamps 10.

If the composite picture contains a plurality of different still subjects, then the exposure is made up by indexing the line screen 21 to one of its end positions relative to the composite picture and exposing that picture on the lamps while both the lamps and line screen are stationary. Then, with the projected beam cut off from the sign, the composite picture is moved relative to the line screen 21 by a distance equal to the width of one line thereof to bring the next picture into view, the lamps are rotatably indexed by an amount equal to the width of their respective slots in the grid 11 to bring areas of unexposed emulsion into place, and then the projected image is thrown on the lamps to expose that picture. This intermittent indexing of the line screen relative to its composite picture and intermittent rotatable indexing of the lamps relative to their slots and exposure are continued until all of the pictures on the composite picture 20 are exposed on the peripheries of the lamps or until all of the available emulsion on the lamps is exposed. The composite picture 20 is moved relative to its line screen 21 in the present instance, rather than vice versa, so that the adjusted orientation between the lines of screen 21 and the slots of grid 11 will not be altered and/or have to be accommodated for. Now the exposed films are removed from the lamps and processed in the proper manner to produce transparencies. The processed films are then replaced on the peripheries of the same lamps on which they were exposed and with the same orientation on their respective lamps. If the lamps are now turned on, and the sign is viewed from the front, a large counterpart of the composite picture 20 will be seen, the pictures being changeable merely by simultaneously indexing the lamps behind the slotted grid 11 by amounts substantially equal to the width of said slots. Obviously, because of the inversion of the projected image by the noted optical projection system, if the composite picture 20 is not placed in an upside down position during exposure, the order of the lamps in the sign will have to be reversed upon playback in order to make the picture appear right-side up.

If the composite picture 20 contains a motion sequence which is to be placed on the lamps of the sign, the exposure can be made continuous by shifting the composite picture 20 continuously relative to its line screen, and, at the same time, continuously rotating the lamps relative to their respective slots in grid 11. To this end I have shown the composite picture having a follower 25 engaging a peripheral cam 26 for shifting it behind its line screen 21. The cam 26 is fixed to one end of a shaft 27, the other end thereof including a beveled gear 28 engaging a beveled gear 29 fixed to the end of worm 14. The shaft 27 can be driven by any suitable source of power, not shown. The rise of the cam 26 and the gear ratio of the lamp drive is so designed that during the time it takes the composite picture 20 to move the width of one of the lines of its screen 21, each of the lamps 10 is rotating by an amount equal to the width of their respective slots in grid 11. And, if the lamps are rotated in a direction opposite to the movement of a composite picture, the projected subject matter will move along with the film at the same rate so that there will be no relative motion between the two to cause a blurred exposure.

It will thus be seen that by using a relatively large original composite picture as the projected subject in exposing the lamps, certain decided advantages are obtained. First, a much shorter throw is needed to project up to the large sign size than when using 16 or 35 mm. transparencies, and this factor becomes a significant one when the problem of finding suitable accommodations for making such exposures is encountered. Secondly, since the original subject is in composite or multiple line form, it can be displayed beforehand behind its own line screen, and the quality of the subject, when so displayed, can be ascertained without going to the expense of making up a large sign in order to find this out. All subjects are not susceptible to display in this form, either because of the type of motion involved, or for some other reason. Also, certain subjects may require different width and disposition of lines in the taking screen and in the slots in the sign grid in order to bring out the definition in certain parts thereof, and this cannot be readily ascertained without first making up the subject as a multiple line composite picture.

Some difficulty may be experienced with this method of exposure due to the moiré pattern incurred when projecting from one composite picture to another. This difficulty is not new and is common in printing or enlarging processes for lenticular films. It arises from the highly sensitive orientation required so that the lenticules or picture elements on each photographic medium are exactly parallel to each other.

This moiré pattern problem can be adequately solved in the present method by mounting each of the lamps in a shield containing its own slot, and which shields and slots will form a grid behind which the lamps are mounted, as disclosed in the above-noted copending patent application Serial No. 164,722. As indicated in Figs. 3 and 4, each lamp 10 will be rotatably mounted within a box-like light shield 30 having an elongated slot S extending longitudinally thereof, said lamps and shields being handled as single components which can be placed in and removed from the sign individually. When the lamps having these box-like shields are stacked in a sign support, in the manner indicated in Figs. 3 and 4, the slotted shields will form a grid similar to grid 11, shown in Fig. 1, through which the lamps may be exposed and displayed. The advantage of such a construction arises from the fact that each lamp has its own slit through which it is exposed and displayed, and whose orientation relative to the lamp, except for rotation, is fixed. Moire will be caused by lack of parallelism between the picture elements on the object composite picture 20 and the slots S in the grid in front of the lamps. In Fig. 4 I have shown how the projected picture elements E of the object composite picture 20 might lie at an angle to their respective slots in the sign grid and cause moire, and it will be noticed that the lack of parallelism does not necessarily occur in the same direction at all slots. Actually, the projected picture element E will fill its corresponding slot in the sign grid, but in order to clearly indicate its location and presence, I have purposely shown the element narrower than the slot in the grid. To overcome this moiré difficulty, the projected elements E should be aligned with their corresponding slots S in the grid, as shown in Fig. 3. If each lamp on the sign carries its own slot, as shown in Figs. 3 and 4, and the fixed combination or picture component is easily removed from the driving worm 14, as shown and described in the above-noted copending patent application, Serial No. 164,722, it can be replaced on the sign at any slight angle necessary to align its slot S with the projected image of an element of the object and thereby eliminate moire. Thus, there can be a one-to-one positional correspondence between each element on the object composite picture and each slot S on the recording sign so that all moire is eliminated. Once a motion sequence has been placed on the lamps, each arranged so as to eliminate moire during the exposure, the set of lamp components can be replaced on the sign after processing with any angular orientation desired. If this differs from the original orientation, no difficulty ensues, since this is simply a positional definition error which is not important; i. e., it doesn't incorporate any time phase error over the surface of the sign.

In the event one wishes to make a plurality of large changeable signs or display apparatus like these on a production basis, then it would not be prudent to have to orient all of the lamps prior to each exposure in order to eliminate moire, since this would be unnecessarily time-consuming. The preferred procedure in such circumstances would be to make a master grid or line screen for the taking camera by reverse projection from the large sign slit pattern built up from lamp components each having their own slits S. This small grid or line screen would then be used to photograph and display the 8″ x 10″ composite picture which would then be used as the projection object for exposing the pictures on films wrapped around the lamps of the components stacked in the same manner as they were for making the original master grid.

Although I have shown and described certain specific embodiments of my invention, I am fully aware that many modifications thereof are possible. My invention therefore is not to be restricted to the precise details shown and described but is intended to cover all modifications coming within the scope of the appended claims.

Having thus described my invention, what I claim is new and desire to secure by Letters Patent of the United States is:

1. The method of putting the images on the tubular electric lamps forming a part of a grid-type changeable display apparatus of the type described comprising the steps of rotatably mounting a plurality of tubular electric lamps in a bank in side-by-side parallel relation with their axes lying substantially in a given plane; placing a slotted grid in front of said bank of lamps with the same substantially tangent to each of said lamps, the slots in said grid being equal in number to the lamps in said bank and disposed so that one slot extends longitudinally of each lamp and is substantially bisected by a plane coinciding with the diameter of the lamp which is orthogonal to the grid face; projecting a magnified image of a multiple line composite transparency through a line screen like that through which it was made and onto said lamps through the slots in said grid; adjusting the magnification so that there is a one-to-one positional correspondence between each picture element on the transparency and each slot of said grid, and adjusting the orientation of the parts so that each projected picture element of the transparency and respective slot of said grid through which it is projected are in alignment throughout their lengths, then covering the periphery of said lamps with a light-sensitive emulsion and exposing them, while dark, behind said grid to the projected image of said multiple line composite transparency.

2. The method of putting the images on the tubular electric lamps forming a part of a grid-type changeable display apparatus of the type described comprising the steps of rotatably mounting a plurality of tubular electric lamps in a bank in side-by-side parallel relation with their axes lying substantially in a given plane, placing a slotted grid in front of said bank of lamps with the same substantially tangent to each of said lamps, the slots in said grid being equal in number to the lamps in said bank and disposed so that one slot extends longitudinally of each lamp and is substantially bisected by a plane coinciding with the diameter of the lamp which is orthogonal to the grid face; projecting a magnified image of a multiple line composite transparency, containing a series of different still pictures, through a line screen like that through which it was made and onto said lamps through the slots in said grid; adjusting the magnification so that there is a one-to-one positional correspondence between each picture element on the transparency and each slot of said grid, and adjusting the orientation of the parts so that each projected picture element of the transparency and respective slot of said grid through which it is projected are in alignment throughout their lengths; then covering the periphery of said lamps with a light-sensitive emulsion and exposing them while stationary and dark to the projected image of said multiple line composite transparency, cutting the projected beam off of said grid and intermittently adjusting said transparency behind its line screen by a distance equal to the width of one line of the screen and intermittently indexing said lamps by an amount substantially equal to the width of their respective slots, then throwing the projected beam back onto said grid to expose the lamps to a different picture, and repeating this intermittent exposure procedure until the group of pictures on said transparency are exposed on successive portions of the peripheries of said lamps.

3. The method of putting the images on the tubular electric lamps forming a part of a grid-type changeable display apparatus of the type described comprising the steps of rotatably mounting a plurality of tubular electric lamps in a bank in side-by-side parallel relation with their axes lying substantially in a given plane; placing a slotted grid in front of said bank of lamps with the same substantially tangent to each of said lamps, the slots in said grid being equal in number to the lamps in said bank and disposed so that one slot extends longitudinally of each lamp and is substantially bisected by a plane coinciding with the diameter of the lamp which is orthogonal to the grid face; projecting a magnified image of a multiple line composite transparency, containing a series of pictures depicting a motion sequence, through a line screen like that through which it was made and onto said lamps through the slots in said grid, adjusting the magnification of said projected beam so that there is a one-to-one positional correspondence between each picture element on the transparency and each slot of said grid, and adjusting the orientation of the parts so that each projected picture element of the transparency and respective slot are in alignment throughout their lengths; then covering the periphery of said lamps with a light-sensitive emulsion and exposing them, while dark, to the projected image of said multiple line transparency, and continuously shifting said transparency relative to its line screen and rotating said lamps in synchronism so that successive groups of picture elements on said transparency will be exposed on corresponding successive portions of the peripheries of said lamps.

4. The method of making a rotating tube grid-type changeable display apparatus of the type described so as to eliminate moiré pattern difficulties comprising the steps of rotatably mounting a plurality of tubular electric lamps in individual shields, each provided with an elongated narrow slot extending longitudinally of the lamp contained therein; stacking said shield and lamp components in side-by-side parallel relation with said slots lying substantially in a given plane and forming a grid in front of the lamps; illuminating said lamps and exposing a light-sensitive film to a reduced image of said grid pattern; processing said film to a transparency to form a master grid; exposing a light-sensitive film to a series of different pictures through said master grid to form a series of multiple line composite pictures on said film; processing said exposed film to a multiple line composite transparency including the subject matter to be placed on the rotating tubes of the final display apparatus; projecting a magnified image of said composite transparency as seen through said master grid onto the lamps through the slots in the shields covering the same; adjusting the magnification and orientation of the projected image of said master grid and transparency so that there is a one-to-one positional correspondence between each picture element on the transparency and each slot of the shields covering said lamps and the image of each picture element and its respective slit in the master grid is in alignment with its respective slot in the grid in front of said lamps; then covering said lamps, while dark, with a light-sensitive emulsion and exposing them to the projected image of said transparency; and synchronously shifting said transparency behind the master grid and rotating the lamps relative to their individual slots to expose the series of pictures on said transparency on to the peripheries of said lamps.

FORDYCE E. TUTTLE.

No references cited.